(12) United States Patent
Krieger et al.

(10) Patent No.: US 7,992,458 B2
(45) Date of Patent: Aug. 9, 2011

(54) UTILITY VEHICLE HAVING A DRIVE MOTOR AND A SHIFTING CLAW TRANSMISSION WITH AN ELECTRIC MOTOR

(75) Inventors: Karl-Ludwig Krieger, Leutenbach (DE); Frank Sager, Bergisch Gladbach (DE)

(73) Assignee: Daimler AG, Stuttgart (DE)

( * ) Notice: Subject to any disclaimer, the term of this patent is extended or adjusted under 35 U.S.C. 154(b) by 817 days.

(21) Appl. No.: 12/075,790

(22) Filed: Mar. 13, 2008

(65) Prior Publication Data

US 2009/0107270 A1 Apr. 30, 2009

Related U.S. Application Data

(63) Continuation-in-part of application No. PCT/EP2006/008431, filed on Aug. 29, 2006.

(30) Foreign Application Priority Data

Sep. 14, 2005 (DE) ...................... 10 2005 043 703.6

(51) Int. Cl.
*F16H 59/38* (2006.01)
*F16H 3/38* (2006.01)

(52) U.S. Cl. ....................... 74/336 R; 74/339

(58) Field of Classification Search ...................... 74/329
See application file for complete search history.

(56) References Cited

U.S. PATENT DOCUMENTS

| | | | |
|---|---|---|---|
| 5,560,249 A | 10/1996 | Nellums | |
| 2002/0088288 A1* | 7/2002 | Bowen | 74/331 |
| 2003/0065634 A1 | 4/2003 | Parlos et al. | |
| 2004/0116249 A1* | 6/2004 | Kayano et al. | 477/109 |
| 2006/0021456 A1* | 2/2006 | Hughes | 74/340 |
| 2008/0053258 A1* | 3/2008 | Ohnemus | 74/329 |

FOREIGN PATENT DOCUMENTS

| | | |
|---|---|---|
| DE | 40 41 117 | 7/1992 |
| DE | 41 29 290 | 2/1993 |
| DE | 42 02 083 | 7/1993 |
| DE | 195 30 231 | 2/1997 |
| DE | 198 59 458 | 6/1999 |
| DE | 199 01 414 | 7/2000 |
| DE | 600 14 291 | 2/2004 |
| DE | 103 44 024 | 5/2004 |
| EP | 1 007 383 | 5/2002 |
| WO | WO 98/40647 | 9/1998 |
| WO | WO 2004/037590 | 5/2004 |

* cited by examiner

*Primary Examiner* — Edwin A Young
(74) *Attorney, Agent, or Firm* — Klaus J. Bach

(57) ABSTRACT

In a motor vehicle, in particular a utility vehicle, having a shifting claw transmission and an electric motor connected to a countershaft of the transmission to facilitate central synchronization for gear speed changes, a transmission controller is connected to the electric motor for sensing the electric motor speed and, together therewith the rotational speed of the countershaft based on the induction values present in at the electric motor and sensed by the transmission controller for use in adjusting the energization of the electric motor.

12 Claims, 1 Drawing Sheet

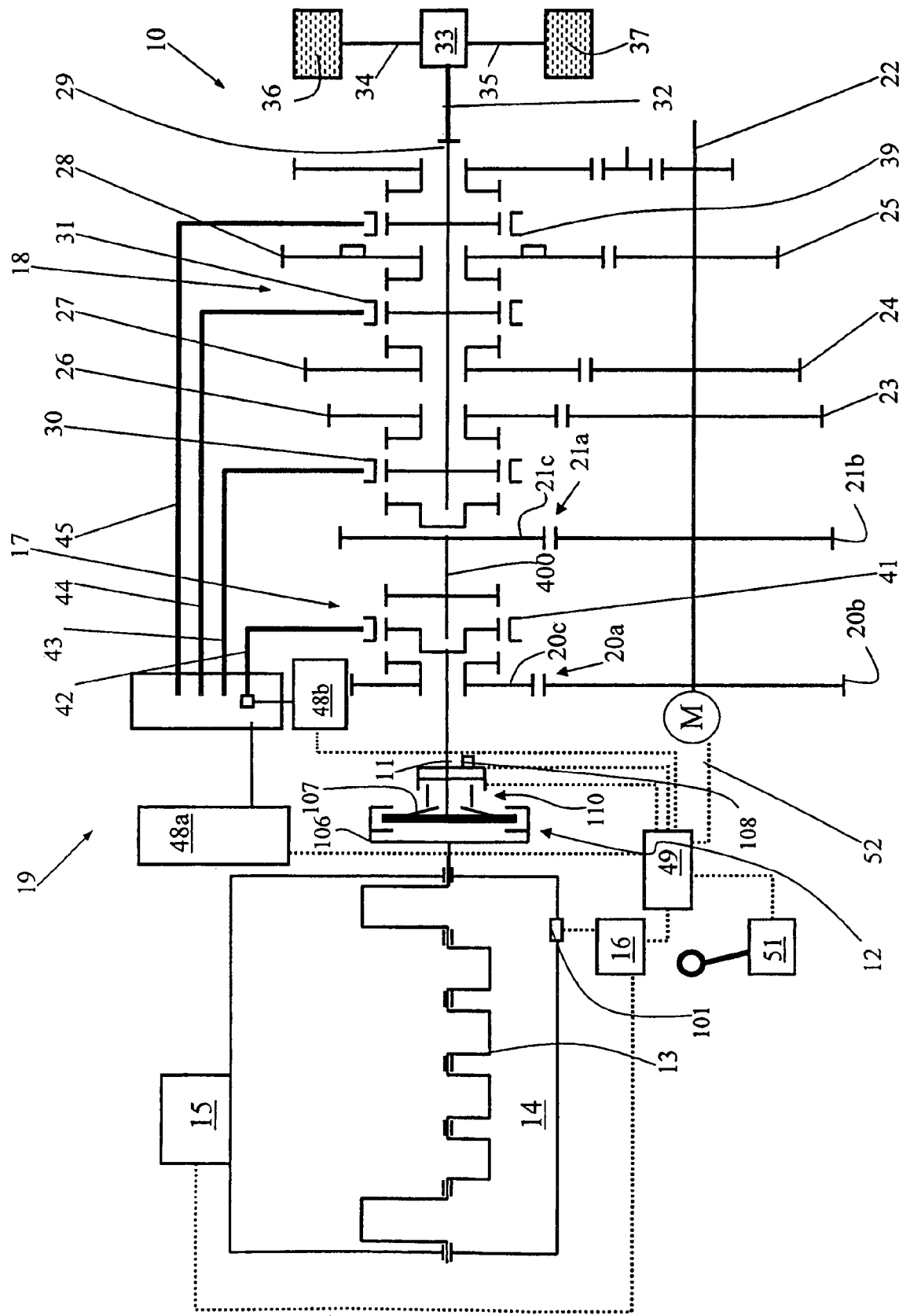

UTILITY VEHICLE HAVING A DRIVE MOTOR AND A SHIFTING CLAW TRANSMISSION WITH AN ELECTRIC MOTOR

This is a Continuation-In-Part application of pending International patent application PCT/EP2006/008431 filed Aug. 29, 2006 and claiming the priority of German patent application 10 2005 043 703.6 filed Sep. 14, 2005.

BACKGROUND OF THE INVENTION

The present invention relates to a utility vehicle having a drive motor or engine and a shifting claw transmission with an electric motor which can also be operated as a generator.

U.S. Pat. No. 5,560,249 discloses a group transmission with claw clutches in which a power synchronizer which comprises an electric motor is used. The electric motor drives a countershaft via an intermediate gearwheel.

In addition, DE 42 020 83 C2 discloses a different generic type of vehicle transmission with electric drive motor for a hybrid vehicle, a which has a frictionally locking synchronization means and an electric machine. The electric machine can be operatively connected to a countershaft so that the latter can be used as synchronization means for relieving the loading on the frictionally locking synchronization means.

EP 1007383 B1 discloses a drive train for a hybrid vehicle including electric machine mounted to a countershaft of a transmission.

DE 195 30 231 discloses a hybrid drive for a motor vehicle in which an internal combustion engine and an electric motor are used for driving the vehicle. The internal combustion engine and the electric motor act simultaneously or alternately on the drive shaft or the countershaft of a speed-changing transmission which is provided with shiftable gearwheels and with synchronous clutches for shifting a plurality of gear speeds. In order to achieve comfortable gear speed changes, the electric motor can be coupled to the drive shaft via a positively locking clutch. This clutch is released when a gear speed is engaged and subsequently the clutch is closed again. Before the clutch closes, the electric motor is adjusted at least approximately to synchronous running in relation to the drive shaft.

An electric motor with a speed change transmission is also known from DE 198 59 458 A1, which however is of a different generic type.

It is the object of the present invention to provide a cost-effective utility vehicle transmission which provides for comfortable and smooth gear speed changes.

SUMMARY OF THE INVENTION

In a motor vehicle, in particular a utility vehicle, having a shifting claw transmission and an electric motor connected to a countershaft of the transmission to facilitate synchronization of transmission gears for smooth gear speed changes, the rotational speed of the countershaft can be determined by means of the induction values present in the electric motor and supplied to a transmission controller for use in adjusting the energization of the electric motor.

The utility vehicle according to the invention comprising a gear shift transmission can have a high number of gear speeds, in particular more than six forward gear speeds, owing to the small rotational speed range of the drive motor, in particular of a diesel engine, and the high useful load in the laden state. In this context, as a group transmission the transmission may have, in addition to a main group, in particular a split group and/or a range group.

Utility vehicle transmissions comprising gear shift devices have a long service life and a high level of reliability owing to the fact that no frictional synchronization means are used. The problems if no blocking synchronization means are used is that in an extreme case the shifting tooth arrangements of the freely rotating wheel of the engaging target gear speed and of the associated shaft could be in tooth-to-tooth positions. Such occurrences are reliably avoided according to the invention in that an electric motor changes the rotational speed of the countershaft so that up to the positively locking engagement of the tooth arrangements there is still a small difference in rotational speed between the freely rotating wheel of the engaging target gear speed and the shifting tooth arrangement on the associated shaft. In this way, this electric motor can be operated for shifting up and shifting down both in a braking and accelerating fashion. In this context, a plurality of different gear speeds of the main group can be synchronized so that the electric motor forms a central synchronization means. This electric motor does not serve as the sole drive for the utility vehicle, in contrast, for example, to hybrid vehicles, since an electric motor with such large dimensions is very slow-acting. Such a slow-acting electric motor could not meet the high dynamic requirements which an electric motor has to meet in order to be able to quickly accelerate and/or brake the countershaft for comfortable and rapid gear speed changes. However, in particular when a heavily laden utility vehicle drives on an incline rapid gear speed changes are advantageous.

The inventive use of gear shift engagement claws relates primarily to the shift clutches in the main group. A possibly additional range group can be embodied a) as a planetary gear mechanism with a claw clutch,
   b) as a cylindrical gear mechanism with a claw clutch,
   c) or as a cylindrical gear mechanism with frictionally locking synchronization means.

Such a transmission which is specified under c) and which has claw clutches in the main group and frictionally locking synchronization means in the range group is known, for example, from U.S. Pat. No. 5,560,249. A possible split group can also be embodied either with frictionally locking synchronization means or with shifting claws.

In a particularly cost-effective way, the rotational speed of the countershaft is determined by the transmission controller by means of induction variables at the electric motor. The higher the rotational speed of the countershaft, the higher the voltage which is induced in the electric motor, there being a proportional relationship.

A particularly cost-effective embodiment of the electric motor is a power converter-controlled squirrel cage rotor asynchronous motor.

In a particularly advantageous embodiment, the electric motor ensures that the starter gear speed can be engaged quickly in the stationary state of the utility vehicle and at low speeds. In this way, the freely rotating wheels and in particular the freely rotating wheel of the gear speed which is to be engaged can be rotated by means of the countershaft or electric motor so that at standstill the tooth-to-tooth abutment problem cannot occur. Since the electric motor which is very dynamic and therefore only has relatively small dimensions cannot be connected to the drive engine in this context, when there is a timing overlap a clutch is opened in the force flux between the countershaft and the drive motor. This clutch can be, for example, the starter clutch. In addition, it may be a shifting element of a split group which has a neutral position.

The electric motor has the advantage over hydraulic actuator elements, such as for example a hydraulic transmission multidisk brake, that there is no dependence on the temperature of the transmission oil. Compared to such a transmission multidisk brake, there are also no churning losses in a transmission oil bath so that the overall efficiency of the shifting claw transmission is improved and the fuel consumption is reduced.

In one particularly advantageous embodiment of the invention, the electric motor can, in what is referred to as the boost mode, assist the drive power of the internal combustion engine, for example during passing maneuvers. In order to provide for the abovementioned dynamic needs for comfortable gear speed changes, the power output of the electric motor is, however, only sufficient to assist the drive motor.

A clutch can be provided between the countershaft and the electric motor. However, omission of such a clutch has certain advantages. For example, given correspondingly small dimensioning of the electric motor, the rotating masses are small compared to the countershaft so that positive and negative accelerations of the countershaft take place very dynamically. Without such a clutch means, no additional actuator elements which could entail disadvantageous dynamic effects are present.

If the electric motor is energized in a direction opposite to the rotation of the countershaft, the countershaft can be braked particularly quickly.

By controlling the energization of the electric motor the rotational speed of the countershaft can be rapidly adjusted by means of the electric motor in a simple manner. This provides dynamic advantages, in particular over friction brakes which are not suitable for regulated operation due to their dynamics.

The invention will become more readily apparent from the following description of an exemplary embodiment thereof with reference to the accompanying drawing.

BRIEF DESCRIPTION OF THE DRAWING

The single FIGURE is a schematic view of a complete drive train 10 of a utility vehicle, which is otherwise not illustrated.

DESCRIPTION OF AN EXEMPLARY EMBODIMENT

The drive train 10 comprises a drive motor 14 whose injection system 15 is actuated via a controller device 16. The drive motor 14 is a supercharged diesel engine, as is typical for a utility vehicle. This diesel engine can be, for example, a 6 cylinder or 8 cylinder engine.

A crank shaft 13 is connected in a rotationally fixed fashion to a primary half 106 of a dry, frictionally locking starter clutch 12 via a crank shaft flange (not illustrated), said starter clutch 12 also forming the flywheel mass of the drive motor 14. This primary half 106 can be coupled in a frictionally locking fashion to a secondary half 107 of the starter clutch 12.

The starter clutch 12 is arranged axially between the crank shaft 13 and a transmission input shaft 11 of an automated synchronous ring-free shifting claw transmission 19. The starter clutch 12 and the shifting claw transmission 19 are actuated by a transmission controller 49. The transmission controller 49 has a signal-conducting connection to
    an actuator element 110 of the starter clutch 12,
    a transmission input shaft rotational speed sensor 108, with which the rotational speed of a transmission input shaft 11 can be sensed,
    and
    sensors (not illustrated) of the starter clutch 12 and of the shifting claw transmission 19.

In this way, the transmission controller 49 can open or close the starter clutch 12 and carry out gear speed changes in the shifting claw transmission 19. The transmission input shaft rotational speed is determined by the transmission input shaft rotational speed sensor 108 and stored in the transmission controller 49.

The transmission controller 49 has a signal-conducting connection to the control device 16, as a result of which data, for example relating to operational variables of the drive motor 14 or of the shifting claw transmission 19, can be exchanged and a request can be made for changes in rotational speed of the drive motor 14, which is then implemented by the control device 16. In particular, the control unit 16 can pass on the rotational speed of the crank shaft 13 to the control device 49. This rotational speed of the crank shaft 13 is sensed by means of the rotational speed sensor 101. The transmission controller 49 is also connected to an operator control unit 51 by means of which a driver of a vehicle can request gear speed changes of the shifting claw transmission 19. Alternatively, gear speed changes from an original gear speed to a target gear speed can also be triggered in a fully automated fashion by the transmission controller 49. The determination of the target speed is dependent here, inter alia, on the speed of the motor vehicle and on a degree of activation of an accelerator pedal by the driver of the vehicle.

The shifting claw transmission 19 is what is referred to as a two-group transmission. However, in an alternative configuration it can also be in the form of a three-group transmission, in which case a main group 18 is adjoined by a range group.

A series-mounted transmission in the form of a split group 17 is connected in rotationally fixed fashion to the transmission input shaft 11. Said main group 18 is arranged downstream of the split group 17. In this way, the following are arranged axially one after the other in the shifting claw transmission 19:
    the transmission input shaft 11,
    an intermediate shaft 400 and
    the main shaft 29.
Here, the intermediate shaft 400 is mounted at its front axial end in the transmission input shaft 11 and at its rear axial end in the main shaft 29.

By means of the split group 17, the transmission input shaft 11 can be operatively connected via two different gearwheel pairings 20a, 21a to a countershaft 22 which is arranged parallel to the transmission input shaft 11. For this purpose, the front gearwheel stage 20a comprises
    a fixed wheel 20b, which is arranged in a rotationally fixed fashion and coaxially at the front end of the countershaft 22, and
    a freely rotating wheel 20c which is arranged in a rotatable fashion and coaxially with respect to the transmission input shaft 11 in the plane of the fixed wheel 20b, in toothed engagement with the latter.
In contrast, the rear gearwheel stage 21a comprises:
    a fixed wheel 21b which is arranged in a rotationally fixed fashion and coaxially on the countershaft 22 downstream of the fixed wheel 20b, and
    a gearwheel 21c which is arranged in a rotationally fixed fashion on, and coaxially with respect to, the intermediate shaft 400 in the plane of the fixed wheel 21b, in toothed engagement with the latter.

The two gearwheel pairings 20a, 21a have a different transmission ratio. The transmission ratio of the respective gearwheel pairing 20a, 21a is selected in that a sliding sleeve 41 is moved axially forward from a neutral position in order to bring about a rotationally fixed connection between the transmission input shaft 11 and the freely rotating wheel 20c of the front gearwheel pairing 20a or in that the sliding sleeve 41 is moved axially rearward from the neutral position in order to bring about a rotationally fixed connection between the transmission input shaft 11 and the central intermediate shaft 400 or the gearwheel 21c.

In addition, fixed wheels 23, 24, 25 for three different transmission ratios of the main group 18 are arranged fixed in terms of rotation on the countershaft 22. The fixed wheels 23, 24, 25 each mesh with associated freely rotating wheels 26, 27, 28 which are arranged in a rotatable fashion on the main shaft 29 which is arranged coaxially with respect to the transmission input shaft 11. The freely rotating wheel 26 can be connected in a rotationally fixed and positively locking fashion to the main shaft 29 by means of a sliding sleeve 30. The freely rotating wheels 27 and 28 can, in contrast, be connected in a rotationally fixed and positively locking fashion to the main shaft 29 by means of a sliding sleeve 31.

At the front end, the countershaft 22 is coupled to the rotor of an electric motor M whose controller is configured such that the electric motor M can also be operated as a generator. The electric motor M is embodied here as a power converter-controlled squirrel cage asynchronous motor and has a converter (not illustrated). An advantage of the use of a squirrel cage rotor is the lack of commutation. Alternatively, a brushless DC motor with a permanently excited rotor may be used. A brushless motor provides advantages in terms of operating life and freedom from maintenance given the stringent demands made of trucks. In addition to the internal combustion engine it is possible to feed in a torque, for example in order to cover peak loads during overtaking maneuvers, by means of the electric motor M. Such a mode with added drive torques can also be referred to as a boost mode. By means of the electric motor M it is possible to increase and decrease selectively the rotational speed of the countershaft 22 and therefore also the rotational speed of the transmission input shaft 11.

The sliding sleeve 41 of the split group 17 and the sliding sleeves 30, 31, 39 of the main group 18 can each be actuated by shifting rods 42, 43, 44, 45. In this way, a positive-locking connection can be produced between associated shifting elements with shifting established and the main shaft 29 or it can be released. The shifting rods 42, 43, 44, 45 can be activated with an actuator element in the form of an xy actuator 48a, 48b which is activated by the transmission controller 49. If no gear speed is engaged in the shifting claw transmission 19, that is to say there is no freely rotating wheel connected in a positively locking fashion to the main shaft 29, the shifting claw transmission 19 is in what is referred to as a neutral position.

The converted torque and the rotational speed of the drive motor 14 are transmitted from the main shaft 29 by means of a flange-connected drive shaft 32 to an axle transmission 33 which, given balanced torque, transmits the rotational speed via a differential in equal or different proportions to drive wheels 36, 37 via two output shafts 34, 35. In an alternative configuration, the axle transmission is embodied as throughdrive axle, so that the drive power is distributed among a plurality of axles.

In the event of a gear change from an original gear to a target gear, the original gear must first be disengaged. Since the shifting claw transmission 19 is embodied as a transmission without a synchronizing ring, it is necessary, at least in order to be able to engage the target gear for shifting down, to adjust the countershaft 22, and thus also the transmission input shaft 11, approximately to the synchronous rotational speed of the target gear speed by means of the drive motor 14 with the starter clutch 12 closed. The synchronous rotational speed is reached when the freely rotating wheel of the target gear speed and the second main shaft 29 have at least approximately the same rotational speed. There may be in this case a slight difference in rotational speed between the main shaft 29 and the respective freely rotating wheel 26, 27 or 28, 29. In the case of shifting up with the starter clutch 12 opened, the countershaft 22 can be braked by means of the electric motor M in its function as a generator, and the transmission input shaft 11 can therefore be synchronized. In contrast, in the case of shifting down with the starter clutch opened the countershaft 22 can be accelerated by means of the electric motor M and the transmission input shaft 11 can therefore be synchronized.

The disengagement of the original gear stage can be carried out either with the clutch opened or with it closed. Frequent opening and closing of the starter clutch 12 leads here to severe wear and thus entails high costs for replacement of the clutch and immovability of the motor vehicle during the replacement process. For this reason, the objective is to carry out the highest possible proportion of the gear speed changes with the clutch closed. The shifting operations with the clutch closed occur here according to the criteria which are presented in detail in DE 102 49 951 A1.

The electric motor can be arranged coaxially with respect to the countershaft. In an alternative embodiment, the electric motor can also be coupled to the countershaft by means of a step-down transmission i>1. By means of this step-down transmission it is ensured, on the one hand, that the electric motor can have very small dimensions and nevertheless can make available sufficient torque in order to accelerate the countershaft. On the other hand, the rotational speed of the countershaft with respect to the electric motor is stepped up so that even low rotational speeds of the countershaft induce a relatively high rotational speed and therefore a relatively high voltage at the electric motor. In this way it is also possible to sense low rotational speeds at the electric motor. A planetary gear mechanism may be provided as a step-down transmission so that the electric motor is arranged coaxially with respect to the countershaft. Alternatively, an axle-offsetting cylindrical gear mechanism may be provided so that the electric motor is arranged offset in parallel with the countershaft.

A clutch by means of which the masses of the electric motor can be decoupled from the countershaft in order to increase the overall efficiency of the shifting claw transmission may be provided between the electric motor and the countershaft. This clutch may be opened whenever the electric motor is not required. For example, the clutch may be opened whenever there is no need for synchronization, no need to determine the rotational speed of an input shaft and no need to travel in the boost mode.

In an alternative configuration of the invention, the utility vehicle transmission is embodied as a group transmission with three transmission groups, with these transmission groups comprising in succession a split group, a main group and a range group. The range group may be a planetary gear mechanism or a reduction transmission which adjoins the main shaft 29. The range group can in particular comprise two shifted states, one shifted state of which is embodied as a direct through-drive in order to improve the efficiency.

In an alternative configuration of the invention, corresponding to U.S. Pat. No. 5,560,249, two countershafts which are arranged offset in parallel are provided, but only one of them is connected to an electric motor.

In a further alternative configuration, the countershaft can be decoupled when the direct gear speed is engaged so that, in order to improve the efficiency, no drag losses occur at the countershaft in direct gear. The rotational speed of the countershaft is therefore zero during this time.

The described embodiments are only exemplary configurations. A combination of the described features for different embodiments is also possible. Further features, in particular ones which are not described, of the device components which are associated with the invention can be obtained from the geometries of the device components which are illustrated in the drawings.

What is claimed is:

1. A motor vehicle having a drive motor (14), a shifting claw transmission (19) and an electric motor (M) which cannot operate the motor vehicle alone but which can be operatively connected to a countershaft (22) and can be actuated by a transmission controller (49) in order to synchronize the gear speed changes centrally, said transmission controller (49) including sensing means for determining the rotational speed of the countershaft on the basis of induction values in the electric motor (M).

2. The motor vehicle as claimed in claim 1, wherein the electric motor (M) is arranged coaxially with respect to the countershaft (22).

3. The motor vehicle as claimed in claim 2, wherein the electric motor (M) is directly connected to the countershaft (22) for rotation therewith.

4. The motor vehicle as claimed in claim 1, wherein the electric motor (M) is a power converter-controlled squirrel cage asynchronous motor.

5. The motor vehicle as claimed in claim 1, wherein the drive motor (14) of the motor vehicle is a diesel engine, and the motor vehicle has a group transmission with more than six forward gears, said group transmission comprising a split group (17) with at least two input constants and one main group (18).

6. The motor vehicle as claimed in claim 5, wherein the group transmission comprises a transmission output-end range group.

7. A method of shifting a motor vehicle having a drive motor (14), a shifting claw transmission (19) and an electric motor (M) which cannot operate the motor vehicle alone but which can be operatively connected to a countershaft (22) and can be actuated by a transmission controller (49) in order to synchronize the gear speed changes centrally, said transmission controller (49) including sensing means for determining the rotational speed of the countershaft on the basis of induction values in the electric motor (M), said method comprising the steps of: during standstill of the vehicle, accelerating the countershaft (22) before or during engagement of a shifting element by means of the electric motor (M) in order to avoid a tooth-on-tooth or claw-on claw position between gear structures to be shifted into engagement with a freely rotating wheel and the shifting claw arrangement of a sliding sleeve, and, when there is a timing overlap, a clutch which is arranged in the force flux between the drive motor (12) and the shifting claw transmission is at least partially opened.

8. The shifting method for a motor vehicle as claimed in claim 7, wherein said clutch is a starter clutch (12).

9. The shifting method for a motor vehicle as claimed in claim 7, wherein said clutch is a shifting element of a split group (17) and is moved into a neutral position for disengaging a gear.

10. The shifting method for a motor vehicle as claimed in claim 7, wherein the electric motor is operated as a generator for braking the countershaft (22).

11. The shifting method for a motor vehicle as claimed in claim 7, wherein for braking the countershaft (22) the electric motor is actively energized in the rotational direction which is opposed to the direction of rotation of the countershaft.

12. The shifting method for a motor vehicle as claimed in claim 7, wherein the electric motor is regulated for rapidly bringing the countershaft to a particular desired speed facilitating smooth shifting of the claw transmission into or out of a particular gear.

* * * * *